(12) United States Patent
Jin et al.

(10) Patent No.: US 11,702,068 B2
(45) Date of Patent: Jul. 18, 2023

(54) COLLISION DISTANCE ESTIMATION DEVICE AND ADVANCED DRIVER ASSISTANCE SYSTEM USING THE SAME

(71) Applicant: HYUNDAI MOBIS Co., Ltd., Seoul (KR)

(72) Inventors: Moon Yong Jin, Yongin-si (KR); Sung Wan Kim, Yongin-si (KR); Soo yong Ryu, Yongin-si (KR); Hyun Wook Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 200 days.

(21) Appl. No.: 17/107,667

(22) Filed: Nov. 30, 2020

(65) Prior Publication Data

US 2021/0300343 A1 Sep. 30, 2021

(30) Foreign Application Priority Data

Mar. 26, 2020 (KR) .......... 10-2020-0037029

(51) Int. Cl.
*B60W 30/09* (2012.01)
*B60W 30/095* (2012.01)
*B60W 40/10* (2012.01)
*G06V 20/58* (2022.01)
(Continued)

(52) U.S. Cl.
CPC ........ *B60W 30/09* (2013.01); *B60W 30/0953* (2013.01); *B60W 30/0956* (2013.01); *B60W 40/10* (2013.01); *G06V 10/764* (2022.01); *G06V 10/82* (2022.01); *G06V 20/58* (2022.01); *B60W 2554/801* (2020.02); *B60W 2554/802* (2020.02)

(58) Field of Classification Search
CPC ....... B60W 30/09–0956; B60W 40/10; B60W 2554/801–802; G06V 20/58
See application file for complete search history.

(56) References Cited

U.S. PATENT DOCUMENTS 9,435,887 B2 * 9/2016 Kim .................. G01S 17/86
10,227,075 B2 * 3/2019 Zhu ..................... B60W 30/16
(Continued)

FOREIGN PATENT DOCUMENTS

CN 106379316 A1 2/2017
CN 110276988 A1 9/2019
(Continued)

*Primary Examiner* — Calvin Cheung
(74) *Attorney, Agent, or Firm* — H.C. Park & Associates, PLC

(57) ABSTRACT

The present invention relates to a collision distance estimation device and a driver assistance system using the same. The collision distance estimation device includes an image acquisition unit configured to acquire images of surroundings of a vehicle to generate image information, an image reading unit configured to detect and identify an object present around the vehicle from the image information to generate object recognition information, a travel detection unit configured to generate movement distance information on the basis of wheel sensing information, steering information, and the image information, and a collision distance calculation unit configured to calculate collision distance information on the basis of the object recognition information and the movement distance information.

21 Claims, 5 Drawing Sheets

(51) Int. Cl.
  *G06V 10/764* (2022.01)
  *G06V 10/82* (2022.01)

(56) References Cited

U.S. PATENT DOCUMENTS

| | | | | |
|---|---|---|---|---|
| 2007/0152804 | A1* | 7/2007 | Breed | G01S 19/17 |
| | | | | 701/301 |
| 2016/0021312 | A1* | 1/2016 | Kim | G01P 3/00 |
| | | | | 348/148 |
| 2017/0148136 | A1 | 5/2017 | Lee et al. | |
| 2018/0174327 | A1* | 6/2018 | Singh | G06T 7/80 |
| 2018/0288320 | A1* | 10/2018 | Melick | G01S 13/931 |
| 2020/0234574 | A1 | 7/2020 | Park et al. | |

FOREIGN PATENT DOCUMENTS

| | | |
|---|---|---|
| CN | 110481544 A1 | 11/2019 |
| JP | 2019-503294 | 2/2019 |
| KR | 10-1670847 | 11/2016 |
| KR | 10-1835632 | 3/2018 |
| KR | 10-2018-0085550 | 7/2018 |
| KR | 10-2019-0132526 | 11/2019 |

\* cited by examiner

COLLISION DISTANCE ESTIMATION DEVICE AND ADVANCED DRIVER ASSISTANCE SYSTEM USING THE SAME

CROSS-REFERENCE TO RELATED APPLICATION

This application claims priority from and the benefit of Korean Patent Application No. 10-2020-0037029, filed on Mar. 26, 2020, which is hereby incorporated by reference for all purposes as if set forth herein.

BACKGROUND

Field

Exemplary embodiments of the present disclosure relate to a collision distance estimation device and an advanced driver assistance system using the same.

Discussion of the Background

Recently, an advanced driver assistance system (ADAS) has attracted great attention in the automobile industry. The ADAS is a system for securing the safety of a driver and providing convenience to the driver by detecting in advance and handling a risk situation that may occur during driving by using sensors installed in a vehicle.

For example, the ADAS includes an adaptive cruise control (ACC) system, an autonomous emergency braking (AEB) system, and a forward collision warning (FCW) system.

Implementation of such an ADAS requires a technology for detecting the distance from a driver's vehicle to an object (e.g., a vehicle, a person, a structure, or the like).

For example, the cruise control function of the ACC system may be performed normally by detecting front vehicles and accurately estimating the distances to the front vehicles during driving. Furthermore, the above technology may be used in the FCW system to warn a driver about a risk due to proximity to front vehicles or may be used in the AEB system to prevent a collision of a vehicle by autonomous emergency braking.

Since non-operation or malfunction of such advanced driver assistance systems may directly lead to a vehicle accident, it is required to develop a reliable collision distance estimation device capable of accurately detecting the distance between a vehicle and an object.

The above information disclosed in this Background section is only for enhancement of understanding of the background of the invention and, therefore, it may contain information that does not constitute prior art.

SUMMARY

Exemplary embodiments of the present invention provide a collision distance estimation device capable of accurately estimating a collision distance between a vehicle and an object by estimating a longitudinal distance and lateral distance between the vehicle and the object, and a driver assistance system using the same.

A first exemplary embodiment of the present invention provides a collision distance estimation device including an image acquisition unit configured to acquire images of surroundings of a vehicle to generate image information, an image reading unit configured to detect and identify an object present around the vehicle from the image information to generate object recognition information, a travel detection unit configured to generate movement distance information on the basis of wheel sensing information, steering information, and the image information, and a collision distance calculation unit configured to calculate collision distance information on the basis of the object recognition information and the movement distance information.

A second exemplary embodiment of the present invention provides a driver assistance system including an image acquisition unit configured to acquire images of surroundings of a vehicle to generate image information, an image reading unit configured to detect and identify an object present around the vehicle from the image information to generate object recognition information, a travel detection unit configured to generate movement distance information on the basis of wheel sensing information, steering information, and the image information, a collision distance calculation unit configured to calculate collision distance information on the basis of the object recognition information and the movement distance information, and a brake control device configured to brake the vehicle when the collision distance information is less than a preset distance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
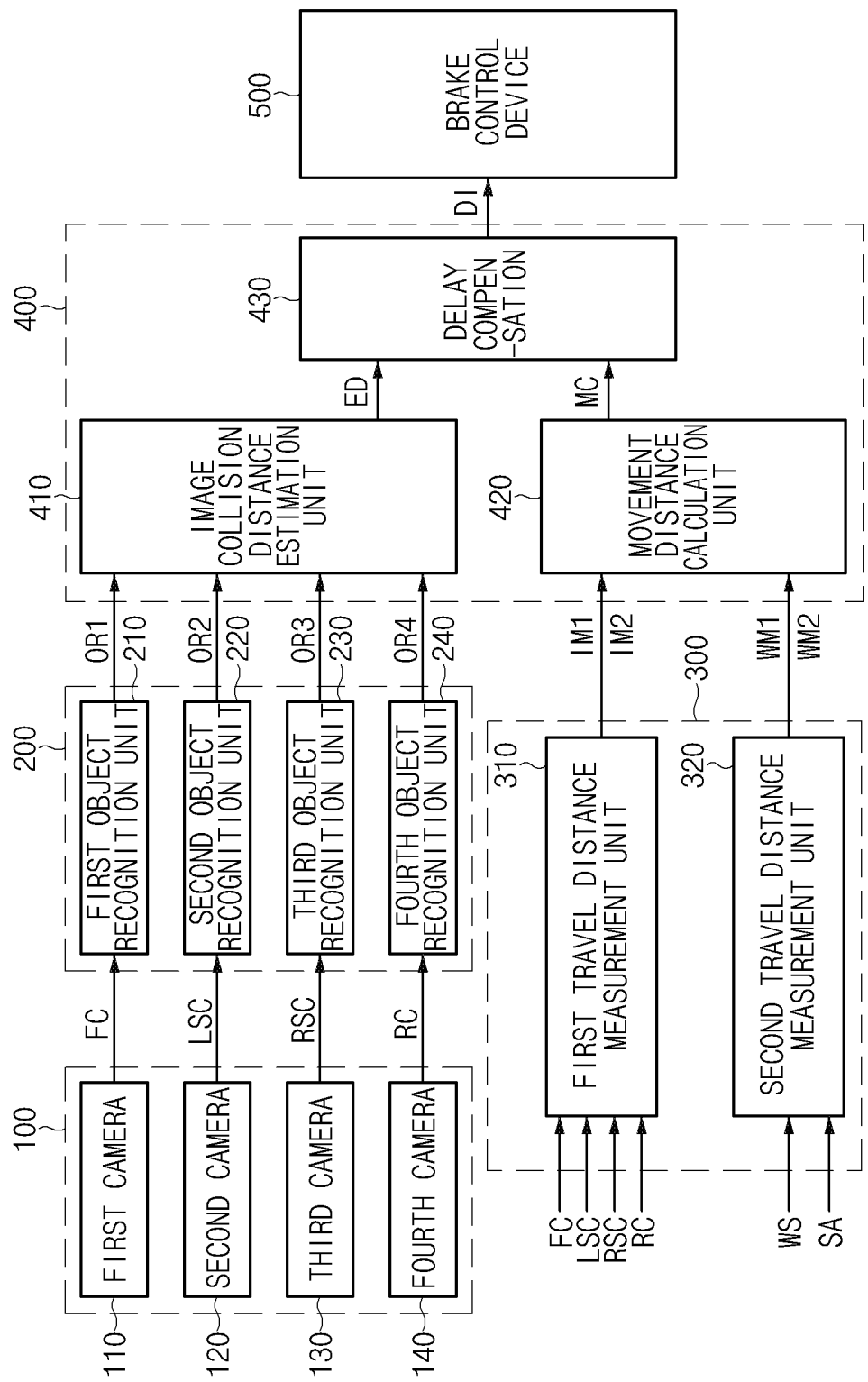
FIG. 1 is a diagram illustrating a collision distance estimation device and a driver assistance system using the same according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, some exemplary embodiments of the present invention will be described in detail with reference to the accompanying drawings. Hereinafter, embodiments of the present invention will be described in detail with reference to FIGS. 1, 2, 3, 4, and 5.

FIG. 1 is a diagram illustrating a collision distance estimation device and a driver assistance system using the same according to an exemplary embodiment of the present invention.

In FIG. 1, the collision distance estimation device and the driver assistance system using the same according to an exemplary embodiment of the present invention may be arranged in a vehicle. Here, the collision distance estimation device and the driver assistance system may be integrated with internal control units of a vehicle, or may be implemented as a separate device and connected to control units of a vehicle by a separate connection unit.

In FIG. 1, the driver assistance system according to an exemplary embodiment of the present invention may include an image acquisition unit 100, an image reading unit 200, a travel detection unit 300, a collision distance calculation unit 400, and a brake control device 500. Here, the driver assistance system according to an exemplary embodiment of the present invention is exemplarily described as, but is not limited to, an autonomous emergency braking system capable of performing autonomous emergency braking. Therefore, the brake control device 500 may be replaced with a vehicle driving control device or warning device such as a collision warning device, an acceleration control device, or the like.

The image acquisition unit 100 may include, as a configuration for acquiring images of surroundings of a vehicle, a plurality of cameras 110, 120, 130, and 140 for acquiring front, left, right, and rear images of a vehicle.

In detail, the image acquisition unit 100 may include first to fourth cameras 110, 120, 130, and 140.

The first camera 110 may acquire a front image of a vehicle and may provide the acquired image to the image reading unit 200 as front image information FC.

The second camera 120 may acquire a left image of a vehicle and may provide the acquired image to the image reading unit 200 as left image information LSC.

The third camera 130 may acquire a right image of a vehicle and may provide the acquired image to the image reading unit 200 as right image information RSC.

The fourth camera 140 may acquire a rear image of a vehicle and may provide the acquired image to the image reading unit 200 as rear image information RC.

The image reading unit 200 may detect and identify an object with respect to each of pieces of the image information FC, LSC, RSC, and RC provided from the image acquisition unit 100.

For example, the image reading unit 200 may detect and identify an object such as a vehicle, a pedestrian, a two-wheeled vehicle, or the like from the front, left, right, and rear image information FC, LSC, RSC, and RC about a vehicle on the basis of deep learning. Here, the image reading unit 200 may include a plurality of object recognition units 210, 220, 230, and 240.

In more detail, the image reading unit 200 may include first to fourth object recognition units 210, 220, 230, and 240, and each of the object recognition units 210, 220, 230, and 240 may detect and identify an object of corresponding image information on the basis of deep learning.

The first object recognition unit 210 may detect and identify an object from the front image information FC provided from the first camera 110, and may provide an identification result to the collision distance calculation unit 400 as first object recognition information OR1.

The second object recognition unit 220 may detect and identify an object from the left image information LSC provided from the second camera 120, and may provide an identification result to the collision distance calculation unit 400 as second object recognition information OR2.

The third object recognition unit 230 may detect and identify an object from the right image information RSC provided from the third camera 130, and may provide an identification result to the collision distance calculation unit 400 as third object recognition information OR3.

The fourth object recognition unit 240 may detect and identify an object from the rear image information RC provided from the fourth camera 140, and may provide an identification result to the collision distance calculation unit 400 as fourth object recognition information OR4.

The travel detection unit 300 may generate movement distance information IM1, IM2, WM1, and WM2 corresponding to a distance travelled by a vehicle during a time taken for the image reading unit 200 to read each of pieces of the image information FC, LSC, RSC, and RC, on the basis of pieces of the image information FC, LSC, RSC, and RC, wheel sensing information WS provided from a wheel sensor, and vehicle steering information SA provided from a steering control system.

For example, the travel detection unit 300 may include a first travel distance measurement unit 310 for generating image movement distance information IM1 and IM2 on the basis of pieces of the image information FC, LSC, RSC, and RC provided from the image acquisition unit 100 and a second travel distance measurement unit 320 for generating wheel movement distance information WM1 and WM2 on the basis of the wheel sensing information WS provided from the wheel sensor and the steering information SA provided from the steering control system.

In more detail, the first travel distance measurement unit 310 may generate a top view on the basis of the front image information FC, the left image information LSC, the right image information RSC, and the rear image information RC provided from the image acquisition unit 100, and may generate the image movement distance information IM1 and IM2 on the basis of the top view. Here, the image movement distance information IM1 and IM2 may include first time point image movement distance information IM1 and second time point image movement distance information IM2, and each of the first and second time point image movement distance information IM1 and IM2 may include information about a longitudinal movement distance and lateral movement distance of a vehicle.

That is, the first time point image movement distance information IM1 generated by the first travel distance measurement unit 310 may include information about a longitudinal movement distance and lateral movement distance of a vehicle based on the top view of a present time, i.e., a most recent time. The second time point image movement distance information IM2 generated by the first travel distance measurement unit 310 may include information about a longitudinal movement distance and lateral movement distance of a vehicle based on the top view achieved a preset time before a present time, i.e., a most recent time.

The second travel distance measurement unit 320 may generate the wheel movement distance information WM1 and WM2 based on the wheel sensing information WS including a rotational speed of a wheel and the steering information SA including a steering angle of a vehicle. Here, the wheel movement distance information WM1 and WM2 may include first time point wheel movement distance information WM1 and second time point wheel movement distance information WM2, and each of the first and second time point wheel movement distance information WM1 and WM2 may include information about a longitudinal movement distance and lateral movement distance of a vehicle.

That is, the first time point wheel movement distance information WM1 generated by the second travel distance measurement unit 320 may include information about a longitudinal movement distance and lateral movement distance of a vehicle based on the wheel sensing information WS and the steering information SA of a present time, i.e., a most recent time. The second time point wheel movement distance information WM2 generated by the second travel distance measurement unit 320 may include information about a longitudinal movement distance and lateral movement distance of a vehicle based on the wheel sensing information WS and the steering information SA achieved a preset time before a present time, i.e., a most recent time.

The collision distance calculation unit 400 may calculate a distance between an object and a vehicle on the basis of pieces of the object recognition information OR1, OR2, OR3, and OR4 related to front, left, right, and rear sides of a vehicle and provided from the image reading unit 200, the image movement distance information IM1 and IM2 provided from the travel detection unit 300, and the wheel movement distance information WM1 and WM2 provided from the travel detection unit 300, may generate calculated information as collision distance information DI, and may provide the generated collision distance information DI to the brake control device 500.

For example, the collision distance calculation unit 400 may estimate the distance between an object and a vehicle on the basis of the first to fourth object recognition information OR1, OR2, OR3, and OR4 provided from the image reading unit 200, and may generate an estimation result as estimated distance information ED.

The collision distance calculation unit 400 may calculate a distance travelled by a vehicle between a first time point and a second time point on the basis of the first time point image movement distance information IM1, the second time point image movement distance information IM2, the first time point wheel movement distance information WM1, and the second time point wheel movement distance information WM2 provided from the travel detection unit 300, and may generate a calculation result as vehicle movement distance information MC.

Here, the first time point may be the same as a time point at which the first time point image movement distance information IM1 and the first time point wheel movement distance information WM1 are generated, and the second time point may be the same as a time point at which the second time point image movement distance information IM2 and the second time point wheel movement distance information WM2 are generated. For example, the first time point may be a present time, and the second time point may be a time point which is a preset time before the present time, i.e., a most recent time.

The collision distance calculation unit 400 may generate the collision distance information DI based on the estimated distance information ED and the vehicle movement distance information MC.

In more detail, the collision distance calculation unit 400 may include an image collision distance estimation unit 410, a movement distance calculation unit 420, and a delay compensation unit 430.

The image collision distance estimation unit 410 may estimate the distance between a vehicle and an object detected around (in front of, on the left of, on the right of, or at the rear of) the vehicle on the basis of the first to fourth object recognition information OR1, OR2, OR3, and OR4, and may provide an estimation result to the delay compensation unit 430 as the estimated distance information ED.

The movement distance calculation unit 420 may calculate a distance travelled by a vehicle between the first time point and the second time point on the basis of the first time point image movement distance information IM1, the second time point image movement distance information IM2, the first time point wheel movement distance information WM1, and the second time point wheel movement distance information WM2, and may provide a calculation result to the delay compensation unit 430 as the vehicle movement distance information MC.

The delay compensation unit 430 may generate the collision distance information DI based on the estimated distance information ED and the vehicle movement distance information MC.

For example, the delay compensation unit 430 may generate the collision distance information DI by adding or subtracting the distance travelled by a vehicle during the time taken for the image reading unit 200 to detect an object, i.e., the vehicle movement distance information MC, to or from the distance between the vehicle and the object detected around the vehicle, i.e., the estimated distance information ED.

In more detail, the delay compensation unit 430 may generate the collision distance information DI by subtracting the vehicle movement distance information MC from the estimated distance information ED when the vehicle moves towards the object.

The delay compensation unit 430 may generate the collision distance information DI by adding the vehicle movement distance information MC to the estimated distance information ED when the vehicle moves away from the object.

The brake control device 500 may brake the vehicle when the vehicle and the object approach each other within a preset distance based on the collision distance information DI.

Figure 2:
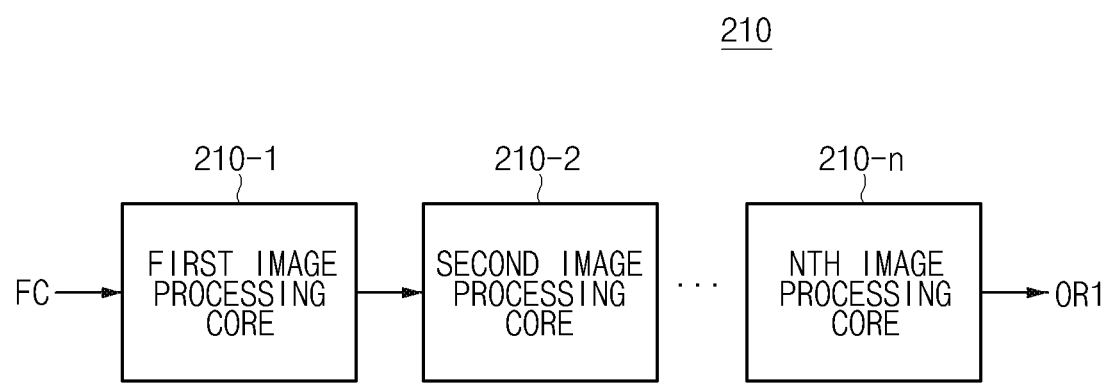
FIG. 2 is a diagram illustrating a configuration of an object recognition unit according to an exemplary embodiment of the present invention.

FIG. 2 is a diagram illustrating a configuration of an object recognition unit according to an exemplary embodiment of the present invention.

Each of the first to fourth object recognition units 210, 220, 230, and 240 included in the image reading unit 200 illustrated in FIG. 1 may include a plurality of image processing cores.

FIG. 2 illustrates the first object recognition unit 210. The other object recognition units 220, 230, and 240 may be only different from the first object recognition unit 210 in terms of input/output signal names, having the same configuration as the first object recognition unit 210.

In FIG. 2, the first object recognition unit 210 may include first to nth image processing cores 210-1 to 210-*n* connected in series.

For example, the first image processing core 210-1 may receive the front image information FC, may perform image processing on the input front image information FC according to a preset algorithm, and may output an image processing result to the second image processing core 210-2. The second image processing core 210-2 may receive the image processing result from the first image processing core 210-1, may perform image processing on the input image processing result according to a preset algorithm, and may output an image processing result to the third image processing core 210-3 (not shown). The nth image processing core 210-*n* may receive an image processing result from the (n−1)th image processing core 210-*n*-1 (not shown), may perform image processing on the input image processing result according to a preset algorithm, and may output an image processing result as the first object recognition information OR1. Here, the preset algorithms of the first to nth image processing cores 210-1 to 210-*n* may include an algorithm for detecting and identifying an object from the front image information FC.

Figure 3:
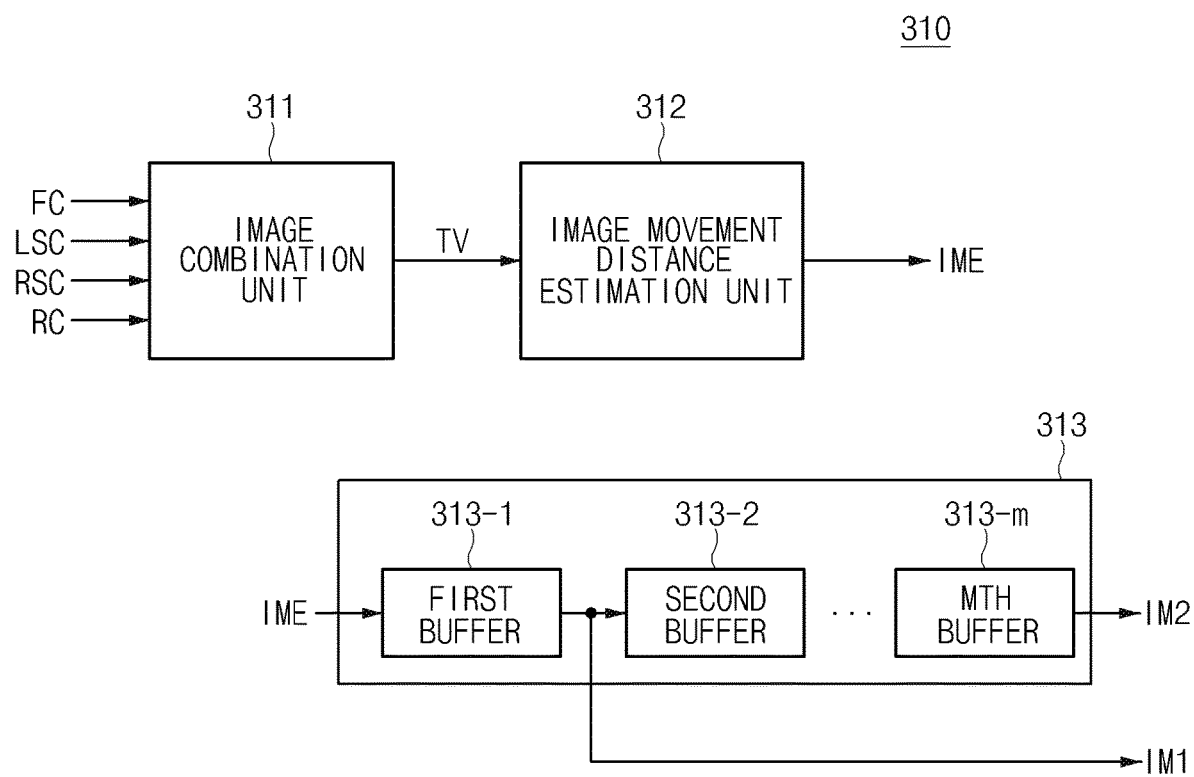
FIG. 3 is a diagram illustrating a configuration of a first travel distance measurement unit according to an exemplary embodiment of the present invention.

FIG. 3 is a diagram illustrating a configuration of a first travel distance measurement unit according to an exemplary embodiment of the present invention.

In FIG. 3, the first travel distance measurement unit 310 may include an image combination unit 311, an image movement distance estimation unit 312, and a time point image movement distance information providing unit 313.

The image combination unit 311 may generate a top view image TV on the basis of the front image information FC, the left image information LSC, the right image information RSC, and the rear image information RC, and may provide the generated top view image TV to the image movement distance estimation unit 312.

The image movement distance estimation unit 312 may estimate a movement distance of a vehicle on the basis of the top view image TV provided from the image combination unit 311, and may provide an estimated movement distance to the time point image movement distance information providing unit 313 as image estimated movement distance information IME. Here, the image movement distance estimation unit 312 may receive, from other devices and systems, and store pieces of parameter information of the first to fourth cameras 110, 120, 130, and 140 for providing the front image information FC, the left image information LSC, the right image information RSC, and the rear image information RC, and may use the parameter information when generating the image estimated movement distance information IME, thus improving accuracy of a vehicle movement distance estimated on the basis of the top view image TV.

For example, the image movement distance estimation unit 312 may detect a particular image of the top view image TV provided from the image combination unit 311, and may detect movement of the detected particular image to estimate a vehicle movement distance.

Since the image movement distance estimation unit 312 estimates a vehicle movement distance based on the top view image TV, the image movement distance estimation unit 312 may estimate the longitudinal movement distance and lateral movement distance of a vehicle.

Therefore, the image estimated movement distance information IME provided by the image movement distance estimation unit 312 may include the longitudinal movement distance and lateral movement distance of a vehicle.

The time point image movement distance information providing unit 313 may store the image estimated movement distance information IME provided from the image movement distance estimation unit 312, and may provide stored information to the movement distance calculation unit 420 as the image movement distance information IM1 and IM2.

For example, the time point image movement distance information providing unit 313 may provide, to the movement distance calculation unit 420, the image estimated movement distance information IME generated on the basis of the current top view image TV as the first time point image movement distance information IM1.

Furthermore, the time point image movement distance information providing unit 313 may provide, to the movement distance calculation unit 420, the image estimated movement distance information IME generated on the basis of the top view image TV achieved a first preset time before a present time as the second time point image movement distance information IM2.

The time point image movement distance information providing unit 313 may include first to mth buffers 313-1 to 313-*m* connected in series.

The first buffer 313-1 may receive and store the image estimated movement distance information IME provided from the image movement distance estimation unit 312, and may provide stored information to the second buffer 313-2 when a second preset time has passed. Here, the information provided from the first buffer 313-1 to the second buffer 313-2 may be provided to the movement distance calculation unit 420 as the first time point image movement distance information IM1. That is, information most recently input and stored in the first buffer 313-1 may be provided to the movement distance calculation unit 420 as the first time point image movement distance information IM1.

The second buffer 313-2 may receive and store information provided from the first buffer 313-1 and may provide stored information to the third buffer (not shown) when the second preset time has passed.

The mth buffer 313-*m* may receive and store information provided from the (m−1)th buffer (not shown), and may provide stored information to the movement distance calculation unit 420 as the second time point image movement distance information IM2 when the second preset time has passed.

Therefore, the first preset time of the time point image movement distance information providing unit 313 may correspond to a sum of the second preset time of each of the first to mth buffers 313-1 to 313-*m*. Here, a generation time difference between the first time point image movement distance information IM1 and the second time point image movement distance information IM2 may correspond to a time taken for each of the object recognition units 210, 220, 230, and 240 of the image reading unit 200 to read the image information FC, LSC, RSC, and RC.

Figure 4:
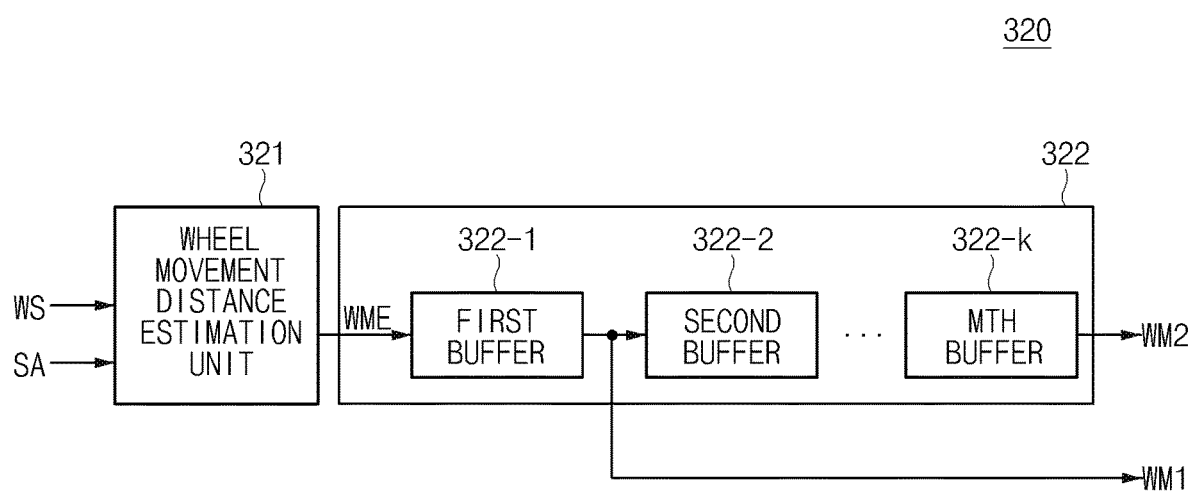
FIG. 4 is a diagram illustrating a configuration of a second travel distance measurement unit according to an exemplary embodiment of the present invention.

FIG. 4 is a diagram illustrating a configuration of a second travel distance measurement unit according to an exemplary embodiment of the present invention.

In FIG. 4, the second travel distance measurement unit 320 may include a wheel movement distance estimation unit 321 and a time point wheel movement distance information providing unit 322.

The wheel movement distance estimation unit 321 may generate wheel estimated movement distance information WME on the basis of the wheel sensing information WS including a rotational speed of a wheel and the steering information SA including a steering angle of a vehicle. Here, since the wheel estimated movement distance information WME is generated on the basis of not only the wheel sensing information WS but also the steering information SA, the longitudinal movement distance and lateral movement distance of a vehicle may be estimated. Therefore, a vehicle movement distance estimated by the wheel movement distance estimation unit 321, i.e., the wheel estimated movement distance information WME, may include the longitudinal movement distance and lateral movement distance of a vehicle.

The time point wheel movement distance information providing unit 322 may store the wheel estimated movement distance information WME provided from the wheel movement distance estimation unit 321, and may provide stored information to the movement distance calculation unit 420 as the wheel movement distance information WM1 and WM2.

For example, the time point wheel movement distance information providing unit 322 may provide, to the movement distance calculation unit 420, the wheel estimated movement distance information WME generated on the basis of the most recent wheel sensing information WS and steering information SA as the first time point wheel movement distance information WM1.

Furthermore, the time point wheel movement distance providing unit 322 may provide, to the movement distance calculation unit 420, the wheel estimated movement distance information WME generated on the basis of the wheel sensing information WS and the steering information SA achieved a first preset time before a present time, i.e., a most recent time, as the second time point wheel movement distance information WM2.

The time point wheel movement distance providing unit 322 may include first to kth buffers 322-1 to 322-*k* connected in series.

The first buffer 322-1 may receive and store the wheel estimated movement distance information WME provided from the wheel movement distance estimation unit 321, and may provide stored information to the second buffer 322-2 when a second preset time has passed. Here, the information provided from the first buffer 322-1 to the second buffer 322-2 may be provided to the movement distance calculation unit 420 as the first time point wheel movement distance information WM1.

The second buffer 322-2 may receive and store information provided from the first buffer 322-1, and may provide stored information to the third buffer (not shown) when the second preset time has passed.

The kth buffer 322-*k* may receive and store information provided from the (k−1)th buffer (not shown), and may provide stored information to the movement distance calculation unit 420 as the second time point wheel movement distance information WM2 when the second preset time has passed.

Therefore, the first preset time of the time point wheel movement distance information providing unit 322 may correspond to a sum of the second preset time of each of the first to kth buffers 322-1 to 322-*k*. Here, a generation time difference between the first time point wheel movement distance information WM1 and the second time point wheel movement distance information WM2 may correspond to a time taken for each of the object recognition units 210, 220, 230, and 240 of the image reading unit 200 to read the image information FC, LSC, RSC, and RC.

Figure 5:
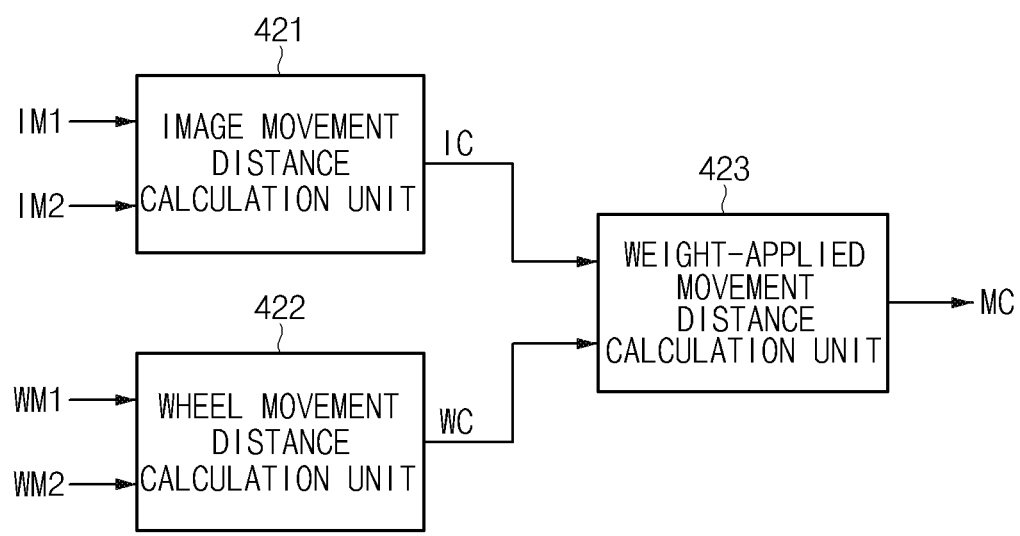
FIG. 5 is a diagram illustrating a configuration of a movement distance calculation unit according to an exemplary embodiment of the present invention.

FIG. 5 is a diagram illustrating a configuration of a movement distance calculation unit according to an exemplary embodiment of the present invention.

In FIG. 5, the movement distance calculation unit 420 may include an image movement distance calculation unit 421, a wheel movement distance calculation unit 422, and a weight-applied movement distance calculation unit 423.

The image movement distance calculation unit 421 may receive the first and second time point image movement distance information IM1 and IM2, and may generate image calculation movement distance information IC on the basis of the first and second time point image movement distance information IM1 and IM2. Here, the image calculation movement distance information IC generated by the image movement distance calculation unit 421 may be provided to the weight-applied movement distance calculation unit 423.

For example, the image movement distance calculation unit 421 may calculate a movement distance difference between the first time point image movement distance information IM1 and the second time point image movement distance information IM2 to provide a calculation result to the weight-applied movement distance calculation unit 423 as the image calculation movement distance information IC.

In more detail, the image movement distance calculation unit 421 may generate the image calculation movement distance information IC by calculating a longitudinal movement distance difference between the first time point image movement distance information IM1 and the second time point image movement distance information IM2.

The image movement distance calculation unit 421 may generate the image calculation movement distance information IC by calculating a lateral movement distance difference between the first time point image movement distance information IM1 and the second time point image movement distance information IM2.

Therefore, the image calculation movement distance information IC may include the longitudinal movement distance and lateral movement distance travelled by a vehicle between the first time point and the second time point.

The wheel movement distance calculation unit 422 may receive the first and second time point wheel movement distance information WM1 and WM2, and may generate wheel calculation movement distance information WC on the basis of the first and second time point wheel movement distance information WM1 and WM2. Here, the wheel calculation movement distance information WC generated by the wheel movement distance calculation unit 422 may be provided to the weight-applied movement distance calculation unit 423.

For example, the wheel movement distance calculation unit 422 may calculate a movement distance difference between the first time point wheel movement distance information WM1 and the second time point wheel movement distance information WM2 to provide a calculation result to the weight-applied movement distance calculation unit 423 as the wheel calculation movement distance information WC.

In more detail, the wheel movement distance calculation unit 422 may generate the wheel calculation movement distance information WC by calculating a longitudinal movement distance difference between the first time point wheel movement distance information WM1 and the second time point wheel movement distance information WM2.

The wheel movement distance calculation unit 422 may generate the wheel calculation movement distance information WC by calculating a lateral movement distance difference between the first time point wheel movement distance information WM1 and the second time point wheel movement distance information WM2.

Therefore, the wheel calculation movement distance information WC may include the longitudinal movement distance and lateral movement distance travelled by a vehicle between the first time point and the second time point.

The weight-applied movement distance calculation unit 423 may generate the vehicle movement distance information MC based on the image calculation movement distance information IC and the wheel calculation movement distance information WC.

For example, the weight-applied movement distance calculation unit 423 may generate the vehicle movement distance information MC by applying weights to each of the image calculation movement distance information IC and the wheel calculation movement distance information WC. Here, a sum of the weights respectively applied to the image calculation movement distance information IC and the wheel calculation movement distance information WC may be 1.

In more detail, the weight-applied movement distance calculation unit 423 may generate the vehicle movement distance information MC by applying the weights to each of the image calculation movement distance information IC and the wheel calculation movement distance information WC and adding up weight-applied result values.

That is, the weight-applied movement distance calculation unit 423 may generate the vehicle movement distance information MC using the expression H*wheel calculation movement distance information WC+(1−H)*image calculation movement distance information IC.

The collision distance estimation device according to an exemplary embodiment of the present invention described above may detect an object from images of surroundings of a vehicle, i.e., images captured in front of, on the left of, on the right of, or at the rear of the vehicle, and may estimate the distance between the object and the vehicle.

Furthermore, the collision distance estimation device according to an exemplary embodiment of the present invention may more accurately acquire the distance between the object and the vehicle, i.e., the collision distance, by estimating the distance travelled by the vehicle during the time required for detecting the object from images of surroundings of the vehicle on the basis of a top view, wheel sensing information, and steering information of the vehicle and by compensating for the distance between the object and the vehicle using an estimated value.

Therefore, the driver assistance system using the collision distance estimation device according to an exemplary embodiment of the present invention may secure safe driving by braking a vehicle or giving a warning when the collision distance generated by the collision distance estimation device is less than a preset distance.

According to the present technology, the longitudinal distance and lateral distance between a vehicle and an object are estimated to accurately estimate a collision distance, and, thus, the accuracy of collision distance estimation can be improved, and the stability and reliability of a driver assistance system using the present technology can be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A collision distance estimation device comprising:
an image acquisition unit configured to acquire images of surroundings of a vehicle to generate image information;
an image reading unit configured to detect and identify an object present around the vehicle from the image information to generate object recognition information;
a travel detection unit configured to generate movement distance information based on wheel sensing information, steering information, and the image information;
a collision distance calculation unit configured to calculate collision distance information based on the object recognition information and the movement distance information: and
a collision avoidance unit configured to: a) output a warning to a driver of the vehicle of a possible collision with the object based on the collision distance information calculated by the collision distance calculation unit in order to enable the driver to take an evasive action to avoid a possible collision with the object, or b) cause an autonomous emergency braking of the vehicle to avoid a possible collision with the object based on the collision distance information calculated by the collision distance calculation unit, wherein the image acquisition unit comprises a plurality of cameras configured to acquire the images of the surroundings of the vehicle to generate the image information, wherein the movement distance information comprises image movement distance information and wheel movement distance information, and wherein the travel detection unit comprises:

a first travel distance measurement unit configured to generate the image movement distance information based on the image information; and a second travel distance measurement unit configured to generate the wheel movement distance information based on the wheel sensing information and the steering information.

2. The collision distance estimation device of claim 1, wherein the image information comprises front image information, left image information, right image information, and rear image information, and wherein the plurality of cameras comprises:

a first camera configured to generate the front image information;

a second camera configured to generate the left image information;

a third camera configured to generate the right image information; and a fourth camera configured to generate the rear image information.

3. The collision distance estimation device of claim 1, wherein the image reading unit comprises a plurality of object recognition units configured to detect and identify the object of the image information based on deep learning.

4. The collision distance estimation device of claim 1, wherein the first travel distance measurement unit configured to generate a top view on the basis of the image information, and configured to generate the image movement distance information corresponding to a longitudinal movement distance and lateral movement distance of the vehicle on the basis of the top view.

5. The collision distance estimation device of claim 4, wherein the first travel distance measurement unit comprises:

an image combination unit configured to generate the top view on the basis of the image information;

an image movement distance estimation unit configured to generate image estimated movement distance information by estimating the longitudinal movement distance and the lateral movement distance based on the top view; and a time point image movement distance information providing unit configured to receive and store the image estimated movement distance information and output stored information as the image movement distance information.

6. The collision distance estimation device of claim 5, wherein the image movement distance information comprises first time point image movement distance information and second time point image movement distance information, and wherein the time point image movement distance information providing unit outputs, as the first time point image movement distance information, the image movement distance information input and stored at a first time point, and outputs, as the second time point image movement distance information, the image movement distance information input and stored at a second time point.

7. The collision distance estimation device of claim 6, wherein the time point image movement distance information providing unit comprises a plurality of buffers connected in series, and wherein a first buffer among the plurality of buffers connected in series receives and stores the image movement distance information, and outputs stored information as the first time point image movement distance information, and a last buffer among the plurality of buffers connected in series outputs the second time point image movement distance information.

8. The collision distance estimation device of claim 7, wherein a time point difference between the first time point image movement distance information and the second time point image movement distance information output from the plurality of buffers connected in series corresponds to a time taken for the image reading unit to read the image information.

9. The collision distance estimation device of claim 6, wherein a difference between the first time point and the second time point corresponds to a time taken for the image reading unit to read the image information.

10. The collision distance estimation device of claim 1, wherein the second travel distance measurement unit generates, based on the wheel sensing information and the steering information, the wheel movement distance information corresponding to a longitudinal movement distance and a lateral movement distance of the vehicle.

11. The collision distance estimation device of claim 10, wherein the second travel distance measurement unit comprises:

a wheel movement distance estimation unit configured to generate wheel estimated movement distance information by estimating the longitudinal movement distance and the lateral movement distance based on the wheel sensing information and the steering information; and a time point wheel movement distance information providing unit configured to receive and store the wheel estimated movement distance information and output stored information as the wheel movement distance information.

12. The collision distance estimation device of claim 11, wherein the wheel movement distance information comprises first time point wheel movement distance information and second time point wheel movement distance information, and wherein the time point wheel movement distance information providing unit outputs, as the first time point wheel movement distance information, the wheel movement distance information input and stored at a first time point, and outputs, as the second time point wheel movement distance information, the wheel movement distance information input and stored at a second time point.

13. The collision distance estimation device of claim 12, wherein the time point wheel movement distance information providing unit comprises a plurality of buffers connected in series, and wherein a first buffer among the plurality of buffers connected in series receives and stores the wheel movement distance information, and outputs stored information as the first time point wheel movement distance information, and a last buffer among the plurality of buffers connected in series outputs the second time point wheel movement distance information.

14. The collision distance estimation device of claim 13, wherein a time point difference between the first time point wheel movement distance information and the second time point wheel movement distance information output from the plurality of buffers connected in series corresponds to a time taken for the image reading unit to read the image information.

15. The collision distance estimation device of claim 12, wherein a difference between the first time point and the second time point corresponds to a time taken for the image reading unit to read the image information.

16. The collision distance estimation device of claim 1, wherein the collision distance calculation unit comprises:
an image collision distance estimation unit configured to estimate a distance between the object and the vehicle based on the object recognition information and output an estimation result as estimated distance information;
a movement distance calculation unit configured to calculate vehicle movement distance information based on the movement distance information; and
a delay compensation unit configured to generate collision distance information based on the estimated distance information and the vehicle movement distance information.

17. The collision distance estimation device of claim 16, wherein the movement distance calculation unit comprises:
an image movement distance calculation unit configured to generate image calculation movement distance information according to the movement distance information based on the image information;
a wheel movement distance calculation unit configured to generate wheel calculation movement distance information according to the movement distance information based on the wheel sensing information and the steering information; and
a weight-applied movement distance calculation unit configured to apply weights to each of the image calculation movement distance information and the wheel calculation movement distance information, and generate the vehicle movement distance information on the basis of weight-applied values.

18. The collision distance estimation device of claim 16, wherein the delay compensation unit generates the collision distance information by adding or subtracting the estimated distance information and the vehicle movement distance information according to a movement direction of the vehicle.

19. The collision distance estimation device of claim 18, wherein the delay compensation unit
generates the collision distance information by adding up the estimated distance information and the vehicle movement distance information when the vehicle travels away from the object, and
generates the collision distance information by subtracting the vehicle movement distance information from the estimated distance information when the vehicle travels towards the object.

20. A collision distance estimation device comprising:
an image acquisition unit configured to acquire images of surroundings of a vehicle to generate image information;
an image reading unit configured to detect and identify an object present around the vehicle from the image information to generate object recognition information;
a travel detection unit configured to generate movement distance information based on wheel sensing information, steering information, and the image information; and
a collision distance calculation unit configured to calculate collision distance information based on the object recognition information and the movement distance information; and
a collision avoidance unit configured to: a) output a warning to a driver of the vehicle of a possible collision with the object based on the collision distance information calculated by the collision distance calculation unit in order to enable the driver to take an evasive action to avoid a possible collision with the object, or b) cause an autonomous emergency braking of the vehicle to avoid a possible collision with the object based on the collision distance information calculated by the collision distance calculation unit,
wherein the image information comprises front image information, left image information, right image information, and rear image information, and
wherein the image reading unit comprises:
a first object recognition unit configured to detect and identify an object from the front image information;
a second object recognition unit configured to detect and identify an object from the left image information;
a third object recognition unit configured to detect and identify an object from the right image information; and
a fourth object recognition unit configured to detect and identify an object from the rear image information.

21. A driver assistance system comprising:
an image acquisition unit configured to acquire images of surroundings of a vehicle to generate image information;
an image reading unit configured to detect and identify an object present around the vehicle from the image information to generate object recognition information;
a travel detection unit configured to generate movement distance information based on wheel sensing information, steering information, and the image information;
a collision distance calculation unit configured to calculate collision distance information based on the object recognition information and the movement distance information; and
a brake control device configured to brake the vehicle when the collision distance information is less than a preset distance,
wherein the image information comprises front image information, left image information, right image information, and rear image information, and
wherein the image reading unit comprises:
a first object recognition unit configured to detect and identify an object from the front image information;
a second object recognition unit configured to detect and identify an object from the left image information;
a third object recognition unit configured to detect and identify an object from the right image information; and
a fourth object recognition unit configured to detect and identify an object from the rear image information.

* * * * *